(12) United States Patent
Kluwe et al.

(10) Patent No.: US 7,580,608 B1
(45) Date of Patent: Aug. 25, 2009

(54) PUSHING-IN FIBER OPTIC CABLE DRIVER

(75) Inventors: Wolf Kluwe, Iserlohn (DE); Karyne P. Prevratil, Watauga, TX (US); Marcel G. Mures, Fort Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/150,519

(22) Filed: Apr. 29, 2008

(51) Int. Cl.
*G02B 6/00* (2006.01)

(52) U.S. Cl. ..................... 385/138; 277/619
(58) Field of Classification Search .............. 385/64, 385/87; 277/607
See application file for complete search history.

(56) References Cited

U.S. PATENT DOCUMENTS

| | | | | | |
|---|---|---|---|---|---|
| 2,258,941 | A | * | 10/1941 | Wayman | 285/149.1 |
| 2,369,413 | A | * | 2/1945 | Rusz | 403/221 |
| 2,424,067 | A | * | 7/1947 | Thoren | 174/77 R |
| 2,449,570 | A | * | 9/1948 | Violette | 333/34 |
| 2,651,529 | A | * | 9/1953 | Wayman | 285/151.1 |
| 2,864,161 | A | * | 12/1958 | Curtiss | 29/505 |
| 3,139,768 | A | * | 7/1964 | Biesecker | 74/502.4 |
| 3,221,292 | A | * | 11/1965 | Swanson et al. | 439/589 |
| 3,268,654 | A | * | 8/1966 | Morrison et al. | 174/138 F |
| 3,297,975 | A | * | 1/1967 | Pope | 439/282 |
| 4,199,212 | A | * | 4/1980 | Baldyga | 439/587 |
| 4,215,913 | A | * | 8/1980 | Turley et al. | 385/64 |
| 4,267,401 | A | * | 5/1981 | Wilkinson | 174/77 R |
| 4,314,094 | A | * | 2/1982 | Smith | 174/78 |
| 4,387,944 | A | * | 6/1983 | Frear | 439/595 |
| 4,406,507 | A | * | 9/1983 | Eifler | 439/595 |
| 4,411,491 | A | | 10/1983 | Larkin et al. | 350/96.21 |
| RE31,515 | E | * | 2/1984 | Heldt | 385/87 |
| 4,447,104 | A | * | 5/1984 | Haggard | 439/449 |
| 4,506,729 | A | * | 3/1985 | Davis et al. | 166/66.5 |
| 4,735,581 | A | * | 4/1988 | Endo et al. | 439/279 |
| 4,768,970 | A | * | 9/1988 | Nestor | 439/278 |
| 4,839,470 | A | * | 6/1989 | Ventura | 174/84 R |
| 4,895,533 | A | * | 1/1990 | Yagi et al. | 439/587 |
| 5,078,622 | A | * | 1/1992 | Hunt et al. | 439/589 |
| 5,323,475 | A | * | 6/1994 | Marsden et al. | 385/77 |
| 5,435,751 | A | * | 7/1995 | Papenheim et al. | 439/589 |
| 5,527,188 | A | * | 6/1996 | Ohtaka et al. | 439/587 |
| 5,540,450 | A | * | 7/1996 | Hayashi et al. | 277/607 |

(Continued)

FOREIGN PATENT DOCUMENTS

JP          01220313 A  *  9/1989

*Primary Examiner*—Frank G Font
*Assistant Examiner*—Peter Radkowski
(74) *Attorney, Agent, or Firm*—John H. Vynalek

(57) ABSTRACT

The present invention discloses a pushing-in device and a method for driving through a cable entry port of an elastomeric sealing element of a fiber optic closure. The pushing-in device comprises a first end having an opening adapted to receive a cable, and a second end having a tip. The tip is capable of penetrating and passing through the cable entry port of the sealing element. The first end is capable of penetrating the sealing element at the cable entry port when the pushing-in device is driven through the cable entry port. In this manner, a cable inserted in the opening of the pushing-in device may be inserted and fed through the sealing element into the fiber optic closure. Also, the pushing-in device may be used as a plug in a cable entry port.

16 Claims, 3 Drawing Sheets

U.S. PATENT DOCUMENTS

| | | | | |
|---|---|---|---|---|
| 5,562,494 A * | 10/1996 | Fujiwara | | 439/587 |
| 5,564,947 A * | 10/1996 | Ingles et al. | | 439/589 |
| 5,720,487 A * | 2/1998 | Kato | | 277/637 |
| 5,927,725 A * | 7/1999 | Tabata et al. | | 277/607 |
| 5,931,699 A * | 8/1999 | Saito | | 439/587 |
| 5,984,724 A * | 11/1999 | McNeel | | 439/606 |
| 6,069,316 A * | 5/2000 | Utke | | 174/652 |
| 6,100,472 A | 8/2000 | Foss | | 174/77 R |
| 6,129,585 A * | 10/2000 | Hashizawa et al. | | 439/607 |
| 6,364,703 B1 * | 4/2002 | Ito | | 439/589 |
| 6,411,767 B1 | 6/2002 | Burrous et al. | | 385/135 |
| 6,493,501 B2 | 12/2002 | Flores et al. | | 385/135 |
| 6,593,529 B2 * | 7/2003 | Nakata et al. | | 174/660 |
| 6,600,104 B2 * | 7/2003 | Nakata et al. | | 174/660 |
| 6,600,105 B2 * | 7/2003 | Nakata et al. | | 174/660 |
| 6,766,094 B2 | 7/2004 | Smith et al. | | 385/135 |
| 7,033,215 B2 * | 4/2006 | Kobayashi | | 439/587 |
| 7,038,137 B2 | 5/2006 | Grubish et al. | | 174/93 |
| 7,040,909 B2 * | 5/2006 | Cairns | | 439/271 |
| 7,333,706 B2 | 2/2008 | Parikh et al. | | 385/135 |
| 7,368,663 B1 * | 5/2008 | Fisher et al. | | 174/74 R |
| 2005/0136722 A1 * | 6/2005 | Cairns | | 439/271 |
| 2007/0025677 A1 | 2/2007 | Harrison et al. | | 385/138 |
| 2007/0036488 A1 | 2/2007 | Harrison et al. | | 385/76 |
| 2008/0066820 A1 * | 3/2008 | Williams et al. | | 138/89 |
| 2008/0205831 A1 | 8/2008 | Prel et al. | | 385/111 |

* cited by examiner

PUSHING-IN FIBER OPTIC CABLE DRIVER

FIELD OF THE INVENTION

The present invention relates generally to a pushing-in device for driving through a cable entry port of a sealing element of a fiber optic closure, such as an assembly, panel, or terminal. More particularly, the present invention relates to a pushing-in device for inserting and feeding a fiber optic cable into a fiber optic closure through a cable entry port of an elastomeric sealing element, and, also, for use as a plug in a cable entry port of an elastomeric sealing element.

TECHNICAL BACKGROUND OF THE INVENTION

A significant percentage of telecommunication applications use elastomers, such as silicones, urethanes and gels, as sealing elements to seal closures against environmental factors. Examples of such closures include without limitation assemblies, panels, or terminals. The sealing element is often called an end cap and comprises several cable entry ports for cables transitioning into and out of the fiber optic closure. The cable entry ports are identified areas in the sealing element designed to facilitate the transitioning of fiber optic cables into and out of the fiber optic closure. Accordingly, a fiber optic cable may enter the fiber optic closure by being pushed or driven through the sealing element at the cable entry port.

However, pushing, driving, or in any manner forcing a cable through such a cable entry port may damage the elastomer and/or affect its sealing properties. Therefore, it would be desirable to provide a device for driving through cable entry ports of a sealing element of a closure to insert and feed cables into the fiber optic closure without damaging the elastomer and/or affecting its sealing properties. Also, it is desirable that such device be capable of acting as a plug for cable entry ports of a sealing element.

SUMMARY OF THE INVENTION

One aspect of the present invention is a pushing-in device for driving through a cable entry port of a sealing element of a closure, the sealing element composed of an elastomer. The pushing-in device comprises a first end having an opening adapted to receive a cable, and a second end having a tip. The tip is capable of penetrating and passing through the cable entry port of the sealing element, and the first end is capable of penetrating the sealing element at the cable entry port when the pushing-in device is driven through the cable entry port. A cable inserted into the opening of the first end can be inserted and fed through the sealing element at the cable entry port when the pushing-in device is driven through the sealing element. Also, the pushing-in device may be used as a plug when a cable is not in the cable entry port.

Another aspect of the present invention is a pushing-in device for driving a cable through a cable entry port of a sealing element of an assembly like a fiber optic terminal. The pushing-in device comprises a cylindrically shaped middle section, and at each end of the cylindrically shaped middle section an end section. A first end section is positioned at the first end of the middle section. The first end section comprises an opening for inserting a cable into the first end section. A second end section is positioned at a second, opposite end of the middle section. The second end section is bullet-shaped, so that the pushing-in device can be inserted into a cable entry port by said second end section. A cable inserted into the first end section of the pushing-in device can be fed through the cable entry port by driving the pushing-in device through the cable entry port.

Another aspect of the present invention is a method for driving through a cable entry port of a sealing element of a closure. The method comprises the steps of providing a pushing-in device comprising a first end section having an opening adapted to receive a cable and a second end section having a tip, and driving the pushing-in device through the cable entry port of the sealing element. The tip penetrates and passes through the sealing element. The first end section also penetrates the sealing element at the cable entry port. The first end section may be used to plug the sealing element at the cable entry port. Also, the method may further comprise the step of inserting a cable in the opening of the first end section. The cable inserts and feeds through the sealing element at the cable entry port into the closure when the pushing-in device is driven through the sealing element.

The pushing-in device according to the present invention allows pushing in cables through cable entry ports of a sealing element of a closure without the risk of damaging the elastomeric material of sealing elements or affecting its sealing properties. The pushing-in device according to the present invention allows a clean transit through sealing elements of cable entry ports insuring minimum exposure to the elastomeric material of the sealing elements. The pushing-in device according to the present invention can be used for various cable shapes and sizes. Additionally, the pushing-in device according to the present invention can be used as a plug for various cable entry size ports.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
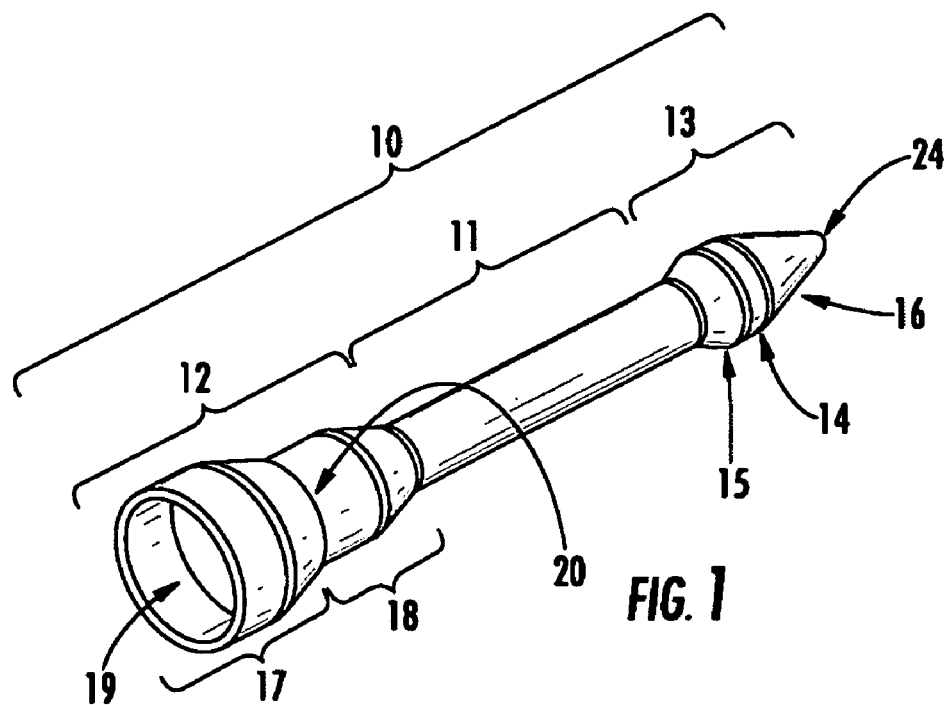
FIG. 1 is a perspective view of a pushing-in device, according to one embodiment of the present invention.

Reference will now be made in detail to the preferred embodiment of the invention, an example of which is illustrated in the accompanying drawings. Whenever possible, the same reference numerals will be used throughout the drawings to refer to the same or like parts. One embodiment of the pushing-in cable driver of the present invention is shown in FIG. 1, and is designated generally throughout by the reference numeral 10. Although the term cable is used throughout this document, it should be understood to include and mean not only a fiber optic cable, but, also, other types of cables. Additionally, where the terms assembly, closure or terminal are used in this document such terms should be understood to mean any type of closure. Further, the term driving should be understood to mean and include any action involving, but not limited to, pushing, forcing, or similar action.

FIG. 1 shows a perspective view of a pushing-in device 10 for driving through a cable entry port of a sealing element of an assembly like a fiber optic closure or fiber optic terminal. The pushing-in device 10 has an end terminating in a tip. An opposite end of the pushing-in device 10 has one or more conically shaped subsections and an opening adapted to receive a cable. The tip is capable of penetrating and passing through a cable entry port of the sealing element. The tip allows for easy access into the assembly with minimum or no damage to the elastomeric material of the sealing element. As the pushing-in device 10 is driven through the sealing element, the opposite end also penetrates the sealing element at the cable entry port. The conically-shaped subsection allows for minimum exposure to the elastomeric material as the opposite end penetrates the sealing element. In this manner, a cable inserted in the opening of the pushing-in device 10 may be fed into the assembly. The minimum exposure to the elastomeric material assures that the elastomeric material retains its sealing properties as a cable is fed through the cable entry port, or, alternatively, when the pushing-in device is used as a plug in a cable entry port.

In the embodiment shown in FIG. 1, the pushing-in device 10 comprises a cylindrically-shaped middle section 11, a first end section 12 positioned at a first end of the middle section 11, and a second end section 13 positioned at a second end of the middle section 11, opposite the first end of the middle section 11. The first end section 12 comprises a first conical subsection 17 and a second conical subsection 18. The first conical subsection 17 and the second conical subsection 18 have extended, generally circular bases, providing cylindrical portions. The outside diameter of the base of the first conical subsection 17 is larger than the outside diameter of the base of the second conical subsection 18. An opening 19 adapted for receiving cables is positioned in the base of the first conical subsection 17, and, similarly, in the base of the second conical subsection 18. The base of the first conical subsection 17 is open to allow access to opening 19. The first conical subsection 17 tapers toward and connects to the base of the second conical subsection 18 along parting line 20. The second conical subsection 18 tapers toward and connects to the middle section 11.

Figure 2:
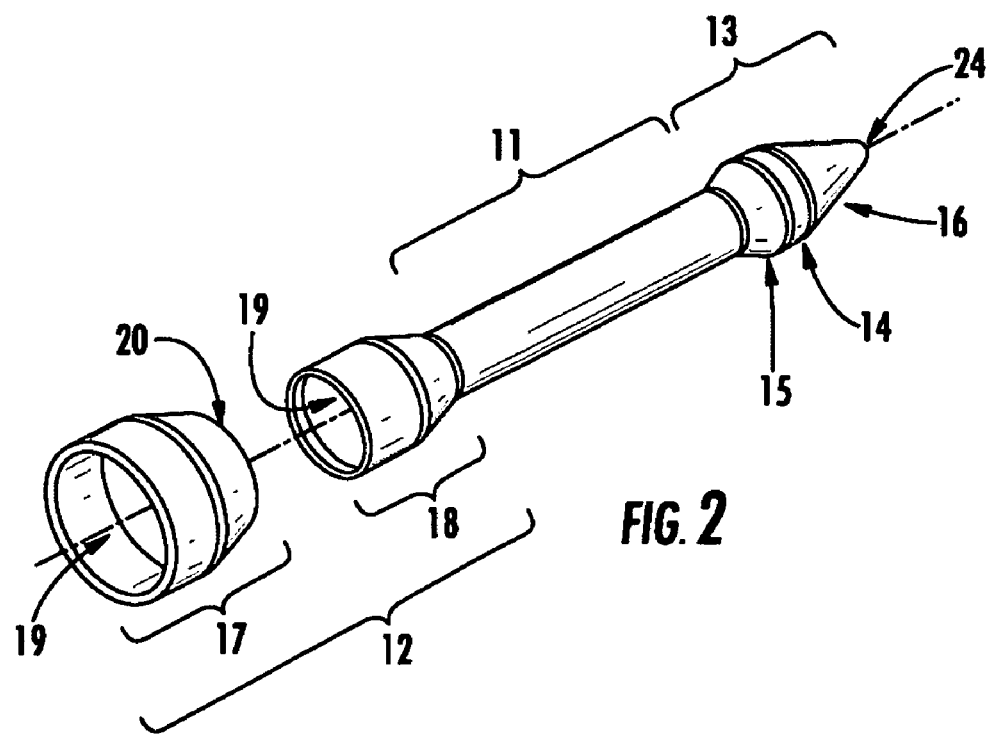
FIG. 2 is a perspective view of the pushing-in device of FIG. 1 shown with a detached conical sub-section.

The first conical subsection 17 and the second conical subsection 18 may be separated from each other by breaking the first end section 12 along the parting line 20. The first conical subsection 17 of the first end section 12 can be broken along the parting line 20 without the need of a cutting tool. FIG. 2 shows the pushing-in device 10 with the first conical sub-section 17 of the first end section 12 being broken along the parting line 20. In such case, the base of the second conical subsection 18 is open to allow access to opening 19.

Figure 3:
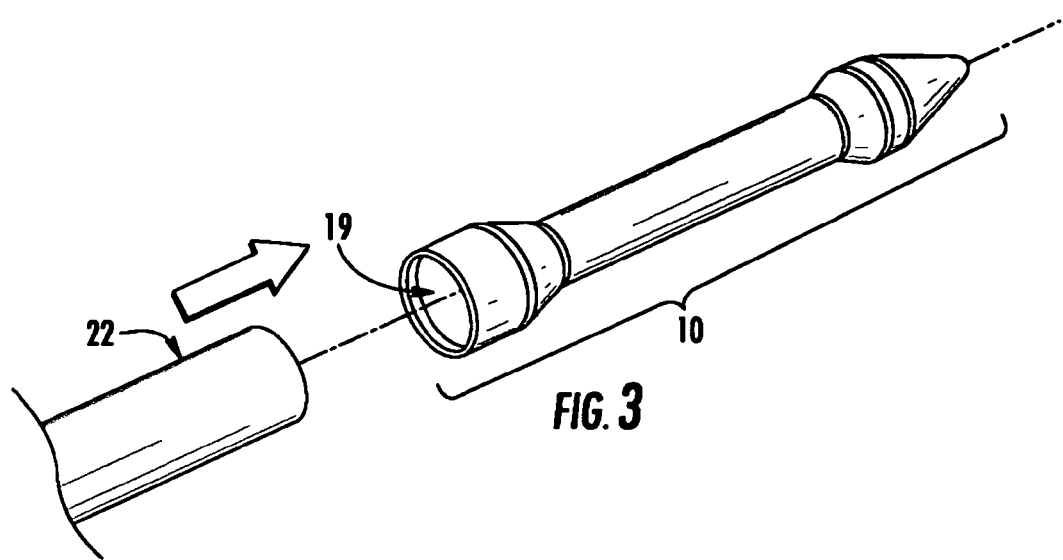
FIG. 3 is a perspective view of the pushing-in device of FIG. 1 together with a fiber optic cable.
Figure 4:
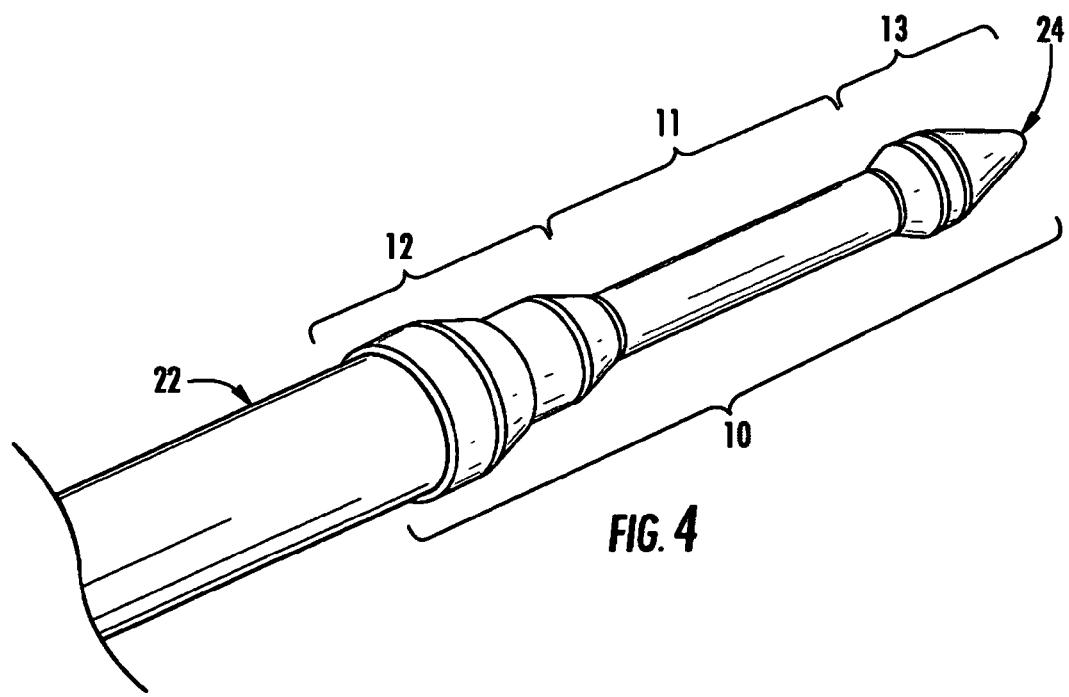
FIG. 4 is a perspective view of the pushing-in device of FIG. 3 with the fiber optic cable inserted in one end of the pushing-in device.

The diameter of the opening 19 is larger at the base of the first conical subsection 17 than at the base of the second conical subsection 18. As such, cables with a larger diameter may be inserted in the pushing-in device 10 through the opening 19 at the base of the first conical subsection 17. Alternatively, by breaking the first end section 12 along the parting line 20 and separating the first conical subsection 17 from the second conical subsection 18, cables with a smaller diameter may be inserted in the pushing-in device 10 through the opening 19 at the base of the second conical subsection 18. In this manner, cables with different diameters can be inserted into the pushing-in device 10 through the first end section 12. Additionally, the cylindrical portion of the base of the first conical subsection 17 and the second conical subsection 18 allows a length of cable to be inserted into the pushing-in device 10, which provides for stability and support of the cable. FIG. 3 shows the pushing-in device 10 together with a cable 22 to be inserted into the opening 19 through the base of the second conical sub-section 18. FIG. 4 shows the cable 22 already inserted into the opening 19 through the base of the first conical subsection 17.

Referring again to FIGS. 1 and 2, the second end section 13 positioned at the second end of the middle section 11 is bullet-shaped. The second end section 13 comprises a middle subsection 14, a first side subsection 15, and a second side subsection 16. The middle subsection 14 is conically-shaped and has a generally circular base with a larger outer diameter than the middle section 11. Also, the first side subsection 15 of the second end section 13 is conically-shaped and has a generally circular base with a larger outer diameter than the middle section 11. The middle subsection 14 tapers toward and connects to the base of the first side subsection 15. The first subsection 15 tapers toward and connects to the middle section 11. Thus, the first side subsection 15 is positioned between the middle subsection 14 and the middle section 11.

The second side subsection 16 is conically-shaped and has a generally circular base. The middle subsection 14 and the second side subsection 16 connect at their respective bases. Thus, the second side subsection 16 is positioned at the end of the middle section 11 opposite the first side subsection 15, and, accordingly, at the end of the second end section 13. The second side subsection 16 tapers to and terminates in a tip 24 at the end of the second end section 13.

Figure 5:
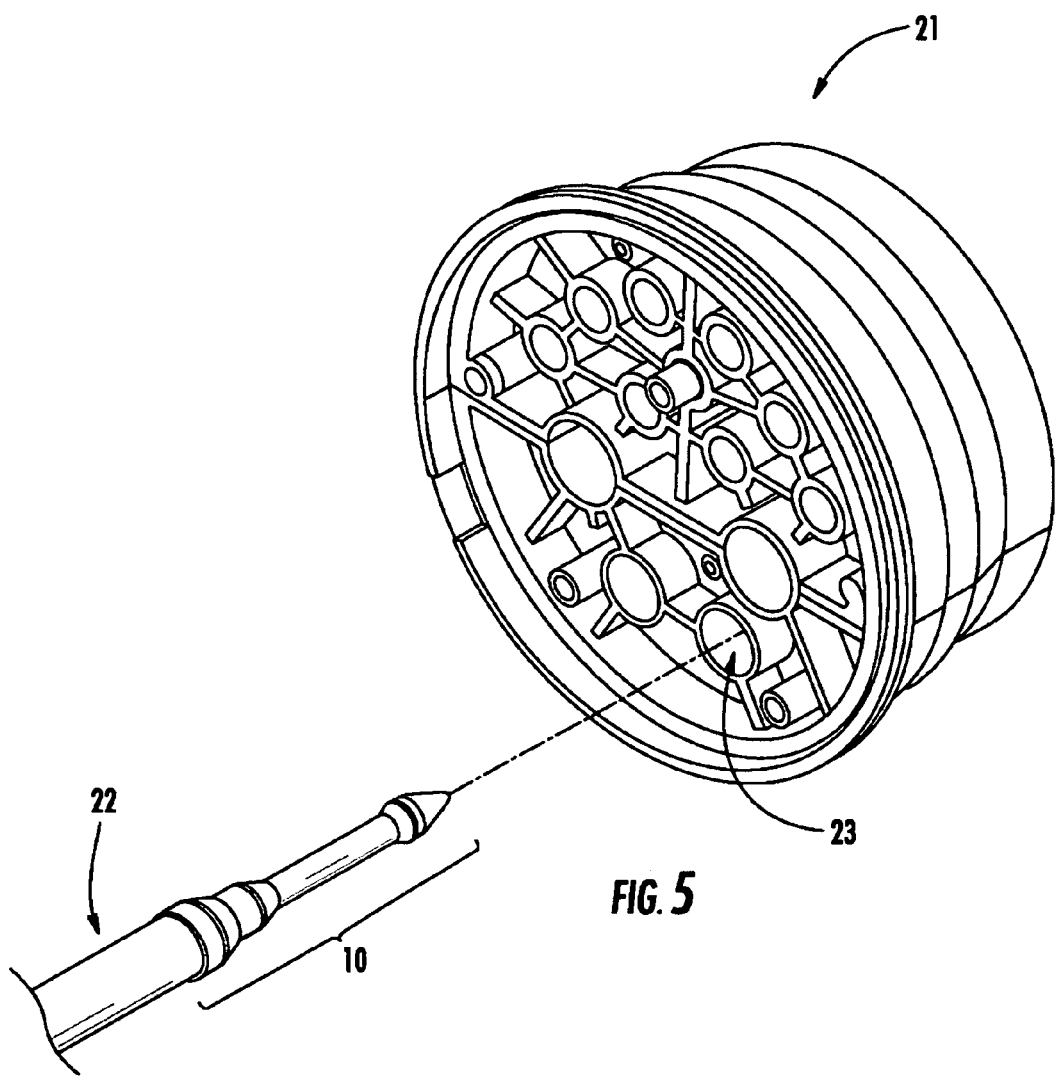
FIG. 5 is a perspective view of the pushing-in device and fiber optic cable of FIG. 3 and a sealing element of a cable closure.

FIG. 5 shows the pushing-in device 10 of FIG. 1 together with a cable 22 and a sealing element 21 of a fiber optic closure, whereby the cable 22 is to be pushed through a cable entry port 23 of the sealing element 21 using the pushing-in device 10. The cable 22 is inserted into pushing-in device 10. As discussed above with respect to FIGS. 3 and 4, the cable 22 may be inserted into the first end section 12 through the opening 19 of either first conical subsection 17 or second conical subsection 18 depending on the size of the cable. The pushing-in device 10 is inserted into a cable entry port 23 of a sealing element 21 using the tip 24 at the end of second end section 13. The tip 24 penetrates and passes through the cable entry port 23 of the sealing element 21. As the tip 24 passes through the sealing element 21 the first end section 12 penetrates the sealing element 21 at the cable entry port 23. In such a manner, the cable 22 inserted into the pushing-in device 10 can be fed through the cable entry port 23 by driving the pushing-in device 10 through the cable entry port 23.

Various modifications of the pushing-in device 10 shown in the FIGS. are possible. For example, the first end section 12 is not limited to only two conical subsections but may comprise one or any number of conical subsections. In such case, a parting line 20 may be positioned between adjacent conical subsections. Additionally, one or more of the conical subsections of the first end section 12 may have oval or other shaped bases. The opening 19 may match the shape of the base to accommodate special cable shapes, for example, flat drop cables.

The pushing-in device 10 can also be used as a plug for a given cable entry port. For example, if a cable entry port 23 is not currently being used the sealing element 21 may not be completely sealing the closure. In other words, the sealing properties of the elastomer may be ineffective at the cable entry port. In such case, the appropriate conical subsection 17, 18 may be selected for the size of the cable entry port 23 and used as a plug. The pushing-in device 10 may be driven through the sealing element 21 at the cable entry port 23 until the first end section 12 penetrates but does not pass through the cable entry port 23. The sealing element 21 seals around the selected one of the conical subsections 17, 18 of the first end section 12. The first end section 12 plugs the cable entry port 23 assuring that the elastomer of the sealing element 21 retains its sealing properties.

Accordingly, a method for driving through a cable entry port 23 of a sealing element 21 of a closure, may comprise the steps of providing a pushing-in device 10 comprising a first end section 12 having an opening 19 adapted to receive a cable 22 and a second end section 13 having a tip 24, and driving the pushing-in device 10 through the cable entry port 23 of the sealing element 21. The tip 24 penetrates and passes through the sealing element 21. The first end section 12 also penetrates the sealing element 21 at the cable entry port 23. The first end section 12 may be used to plug the sealing element 21 at the cable entry port 23. Also, the method may further comprise the step of inserting a cable 22 in the opening 19 of the first end section 12. The cable 22 is inserted and fed through the sealing element 21 at the cable entry port 23 into the closure when the pushing-in device 10 is driven through the sealing element 21.

Further, the pushing-in device 10 can be made of any suitable material, including without limitation, molded plastic or metal. If the pushing-in device 10 is made of metal, the pushing-in device 10 can also be used as a grounding device.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

That which is claimed is:

1. A pushing-in device for driving through a cable entry port of a sealing element of a closure, the sealing element composed of an elastomer, the pushing-in device comprising:
    a first end having an opening adapted to receive a cable; and
    a second end having a tip, wherein the tip is capable of penetrating and passing through the sealing element, and wherein the first end is capable of penetrating the sealing element when the pushing-in device is driven through the cable entry port.

2. The pushing-in device of claim 1, wherein the first end is capable of acting as a plug in the sealing element.

3. The pushing-in device of claim 1, wherein a cable inserted into the opening of the first end can be fed through the sealing element at the cable entry port when the pushing-in device is driven through the sealing element.

4. The pushing device of claim 1, wherein the first end section comprises a subsection in which the opening is positioned.

5. The pushing-in device of claim 1, wherein the first end section comprises a plurality of conically-shaped subsections, and wherein one of the plurality of subsections connects to an adjacent one of the plurality of subsections at a parting line, such that the one of the plurality of subsections may be separated from the adjacent one of the plurality of subsections at the parting line.

6. The pushing-device of claim 5, wherein the opening is positioned in one of the plurality of subsections, and wherein the opening is adapted to receive a cable of a certain size, and wherein another one of the plurality of subsections has an opening adapted to receive a cable of a different size.

7. The pushing-in device of claim 1, wherein the pushing-in device is made from one of plastic and metal.

8. A pushing-in device for driving a cable through a cable entry port of a sealing element of an assembly, comprising:
    a cylindrically shaped middle section, having a first side and a second side;
    a first end section positioned at the first side of the middle section, wherein the first end section comprises an opening for inserting an end of a cable into the first end section; and
    a second end section positioned at the second end of the middle section opposite the first end section, the second end section being bullet-shaped, such that the pushing-in device can be inserted into a cable entry port by said second end section, and wherein the second end section is capable of penetrating and passing through the sealing element such that a cable inserted into said first end section of the pushing-in device can be fed through said cable entry port by driving the pushing-in device through said cable entry port.

9. The pushing-in device of claim 8, wherein the second end section comprises,
    a middle subsection having a larger outer diameter than the middle section,
    a first side subsection positioned between the middle subsection and the middle section, and wherein the first side subsection is conically-shaped and has a larger outer diameter than the middle section, and
    a second side sub-section, wherein the second side subsection is conically shaped and has a tip with a smaller outer diameter than the middle section.

10. The pushing-in device of claim 8, wherein said first end section comprises at least two conical sub-sections having different outer diameters and providing openings having different inner diameters so that cables with different diameters can be inserted into said first end section.

11. The pushing-in device of claim 10, wherein adjacent conically-shaped sub-sections of the first end section can be separated from each other by breaking the first end section along a parting line positioned between the adjacent conically-shaped sub-sections.

12. The pushing-in device of claim 8, wherein the pushing-in device is made of plastic or metal.

13. The pushing-in device of claim 8, wherein the pushing-in device serves as one or more of a cable driver, a plug for a cable entry port, and a grounding device if the pushing-in device is fabricated of metal.

14. A method of driving trough a cable entry port of a sealing element of a closure, the method comprising the steps of:

provided a pushing-in device comprising:

a first end having an opening adapted to receive a cable; and a second end having a tip, and driving the pushing-in device through the cable entry port of the sealing element, wherein the tip penetrates and passes through the sealing element, and wherein the first end penetrates the sealing element at the cable entry port.

15. The method of claim 14, wherein the first end plugs the sealing element of the closure at the cable entry port.

16. The method of claim 14, further comprising the step of inserting a cable in the opening of the first end, wherein the cable feeds through the sealing element at the cable entry port into the closure when the pushing-in device is driven through the sealing element.

* * * * *

UNITED STATES PATENT AND TRADEMARK OFFICE
CERTIFICATE OF CORRECTION

| | | Page 1 of 1 |
|---|---|---|
| PATENT NO. | : 7,580,608 B1 | |
| APPLICATION NO. | : 12/150519 | |
| DATED | : August 25, 2009 | |
| INVENTOR(S) | : Wolf Peter Kluwe et al. | |

It is certified that error appears in the above-identified patent and that said Letters Patent is hereby corrected as shown below:

*Col.   Line            Description*
  7      1     A method of driving through a cable entry port of a Signed and Sealed this
Sixth Day of December, 2011

David J. Kappos
*Director of the United States Patent and Trademark Office*